(12) United States Patent
Uchino et al.

(10) Patent No.: US 11,381,372 B2
(45) Date of Patent: Jul. 5, 2022

(54) USER EQUIPMENT AND TRANSMISSION CONTROL METHOD

(71) Applicant: NTT DOCOMO, INC., Tokyo (JP)

(72) Inventors: Tooru Uchino, Tokyo (JP); Kazuki Takeda, Tokyo (JP); Hideaki Takahashi, Tokyo (JP); Kazuaki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 582 days.

(21) Appl. No.: 15/112,722

(22) PCT Filed: Jan. 15, 2015

(86) PCT No.: PCT/JP2015/050955
§ 371 (c)(1),
(2) Date: Jul. 20, 2016

(87) PCT Pub. No.: WO2015/115197
PCT Pub. Date: Aug. 6, 2015

(65) Prior Publication Data
US 2016/0344534 A1 Nov. 24, 2016

(30) Foreign Application Priority Data
Jan. 30, 2014 (JP) .............................. JP2014-016004

(51) Int. Cl.
*H04L 5/00* (2006.01)
*H04W 52/34* (2009.01)
(Continued)

(52) U.S. Cl.
CPC ................ *H04L 5/14* (2013.01); *H04L 5/001* (2013.01); *H04L 5/0053* (2013.01);
(Continued)

(58) Field of Classification Search
CPC .................................. H04W 52/34; H04L 5/14
See application file for complete search history.

(56) References Cited

U.S. PATENT DOCUMENTS

| 2011/0287804 A1 | 11/2011 | Seo et al. |
| 2013/0021980 A1* | 1/2013 | Yang .................... H04B 7/0626 370/328 |

(Continued)

FOREIGN PATENT DOCUMENTS

| EP | 2934055 A1 | 10/2015 |
| JP | 2012-516607 A | 7/2012 |

(Continued)

OTHER PUBLICATIONS

Office Action issued in the counterpart Japanese Patent Application No. 2014-016004, dated Sep. 12, 2017 (10 pages).

(Continued)

*Primary Examiner* — Kent Krueger
(74) *Attorney, Agent, or Firm* — Osha Bergman Watanabe & Burton LLP (57) ABSTRACT

User equipment for transmitting an uplink control channel in multiple cells simultaneously in a radio communication system where transmission of the uplink control channel in a secondary cell is supported is disclosed. One aspect of the present invention relates to the user equipment, comprising: a transmission and reception unit configured to transmit and receive a radio channel to/from a base station via multiple cells configured for carrier aggregation; a simultaneous transmission availability determination unit configured to determine, in response to occurrence of an event where an uplink control channel is to be transmitted in the multiple cells simultaneously, whether the uplink control channel can be transmitted in the multiple cells simultaneously; and a transmission control unit configured to instruct the transmission and reception unit to transmit the uplink control (Continued)

channel in the multiple cells simultaneously if the uplink control channel can be transmitted in the multiple cells simultaneously and control transmission of the uplink control channel in accordance with transmission priorities corresponding to cell types if the uplink control channel cannot be transmitted in the multiple cells simultaneously.

4 Claims, 5 Drawing Sheets (51) Int. Cl.
H04W 72/04 (2009.01)
H04W 72/12 (2009.01)
H04L 5/14 (2006.01)

(52) U.S. Cl.
CPC ....... *H04W 52/34* (2013.01); *H04W 72/0413* (2013.01); *H04W 72/0473* (2013.01); *H04L 5/0035* (2013.01); *H04L 5/0037* (2013.01); *H04L 5/0094* (2013.01); *H04W 72/1247* (2013.01)

(56) References Cited

U.S. PATENT DOCUMENTS

2015/0312922 A1 10/2015 Uchino et al.
2017/0013565 A1* 1/2017 Pelletier ............. H04W 52/146

FOREIGN PATENT DOCUMENTS

| JP | 2012-216969 A | 11/2012 |
| WO | 2013/016638 A1 | 1/2013 |
| WO | 2013/067430 A1 | 5/2013 |
| WO | 2014/091989 A1 | 6/2014 |

OTHER PUBLICATIONS

International Search Report issued in PCT/JP2015/050955 dated Apr. 14, 2015 (2 pages).
Written Opinion of the International Searching Authority issued in PCT/JP2015/050955 dated Apr. 14, 2015 (7 pages).
Sharp; "A special SCell for CA enhancement"; 3GPP TSG-RAN WG2#75, R2-114096; Athens, Greece; Aug. 22-26, 2011 (4 pages).
Sharp; "A special SCell for CA enhancement"; 3GPP TSG-RAN WG2#75bis, R2-115174; Zhuhai, China; Oct. 10-14, 2011 (5 pages).
3GPP TS 36.213 V11.0.0; "3rd Generation Partnership Project; Technical Specification Group Radio Access Network; Evolved Universal Terrestrial Radio Access (E-UTRA); Physical layer procedures (Release 11)"; Sep. 2012 (143 pages).
Extended European Search Report issued in the counterpart European Patent Application No. 15743231.1, dated Jan. 16, 2017 (8 pages).
Office Action issued in the counterpart Japanese Patent Application No. 2014-016004, dated Apr. 3, 2018 (10 pages).

* cited by examiner

| PREFERENTIAL CELL | | SCG | | | |
|---|---|---|---|---|---|
| | | Special SCell | PCell | SCell | COMPLY WITH PREDEFINED PRIORITY AMONG SCell |
| MCG | PCell | Special SCell | PCell | SCell | COMPLY WITH PREDEFINED PRIORITY AMONG SCell |
| | SCell | PCell | | | |
| | Special SCell | Special SCell | | Special SCell | |
| SCG | SCell | COMPLY WITH PREDEFINED PRIORITY AMONG SCell | N/A | | COMPLY WITH PREDEFINED PRIORITY AMONG SCell |

USER EQUIPMENT AND TRANSMISSION CONTROL METHOD

TECHNICAL FIELD

The present invention relates to a radio communication system using carrier aggregation.

BACKGROUND ART

Presently, as a next-generation communication standard of LTE (Long Term Evolution), 3GPP (3$^{rd}$ Generation Partnership Project) is developing specifications for LTE-Advanced. In LTE-Advanced systems, carrier aggregation (CA) technique is introduced to achieve a higher throughput than that of LTE systems while ensuring backward compatibility with the LTE systems. In the carrier aggregation, a component carrier (CC) having the maximum bandwidth of 20 MHz supported by the LTE systems is used as a basic component, and it is designed to achieve communication in a broader band by using these multiple component carriers simultaneously.

In the carrier aggregation, user equipment (UE) can use multiple carrier components simultaneously to communicate with a base station (evolved NodeB: eNB). In the carrier aggregation, a highly reliable primary cell (PCell) to ensure connectivity to the user equipment and a secondary cell (SCell) additionally configured for the user equipment in connection with the primary cell are configured.

The primary cell is similar to a serving cell in the LTE systems and serves as a cell to ensure connectivity between the user equipment and a network. Specifically, in the primary cell, the user equipment can receive a PDCCH (Physical Downlink Control Channel) and a PDSCH (Physical Downlink Shared Channel) and transmit a PRACH (Physical Random Access Channel), a PUCCH (Physical Uplink Control Channel), a PUSCH (Physical Uplink Shared Channel) and a SRS (Sounding Reference Symbol). Also, if the primary cell is changed, the user equipment has to perform handover. On the other hand, the secondary cell is a cell configured for the user equipment additionally to the primary cell. Addition and deletion of the secondary cell are performed with a RRC (Radio Resource Control) configuration.

See 3GPP TS 36.213 V.11.0.0 (2012-09) in details, for example.

SUMMARY OF INVENTION

Problem to be Solved by the Invention

In the current carrier aggregation, among the above-stated uplink radio channels PRACH, PUCCH, PUSCH and SRS, the PRACH, the PUSCH and the SRS are supported for transmission in both the primary cell and the secondary cell. In this case, the user equipment can transmit the PRACH, the PUSCH and the SRS in the primary cell and the secondary cell simultaneously.

In the carrier aggregation up to Rel-11, it is defined that a single CC is always used to transmit the PUCCH. Meanwhile, in Rel-12, it is being discussed that transmissions of the PUCCH in multiple CCs are supported. In other words, the PUCCH is transmitted in only the primary cell, and it has not been defined to transmit the PUCCH via a secondary cell. Accordingly, if many user equipments use a certain cell as the primary cell, the number of user equipments that can connect to the primary cell would be limited due to constraints of PUCCH capacity in that cell.

Also, in the presently discussed inter-eNB carrier aggregation (inter-eNB CA), scheduling is performed in a per base station basis, and it is necessary to transmit the PUCCH for each of cells configured for the user equipment. Accordingly, it is discussed that the PUCCH transmission is supported in not only the primary cell but also the secondary cell.

However, even if simultaneous transmission of the PUCCH in multiple cells as stated above is supported in a radio communication system, the user equipment cannot necessarily transmit the PUCCH in the multiple cells simultaneously. For example, if the user equipment does not support an uplink simultaneous transmission function, the user equipment cannot transmit the PUCCH in the multiple cells simultaneously. Alternatively, in cases where the user equipment cannot reserve an amount of transmit power sufficient to perform the uplink simultaneous transmission, such as the case where the user equipment is in a cell edge, the uplink simultaneous transmission cannot be performed.

In such a case where the user equipment cannot transmit the PUCCH in multiple cells simultaneously, it is considered that priorities are set among cells to transmit the to-be-transmitted PUCCH and the PUCCH transmission is controlled in accordance with the priorities.

In light of the above-stated problem, one object of the present invention is to provide techniques for transmitting an uplink control channel in multiple cells simultaneously in a radio communication system where transmission of the uplink control channels in a secondary cell is supported.

Means for Solving the Problem

In order to achieve the above object, one aspect of the present invention relates to user equipment, comprising: a transmission and reception unit configured to transmit and receive a radio channel to/from a base station via multiple cells configured for carrier aggregation; a simultaneous transmission availability determination unit configured to determine, in response to occurrence of an event where an uplink control channel is to be transmitted in the multiple cells simultaneously, whether the uplink control channel can be transmitted in the multiple cells simultaneously; and a transmission control unit configured to instruct the transmission and reception unit to transmit the uplink control channel in the multiple cells simultaneously if the uplink control channel can be transmitted in the multiple cells simultaneously and control transmission of the uplink control channel in accordance with transmission priorities corresponding to cell types if the uplink control channel cannot be transmitted in the multiple cells simultaneously.

Another aspect of the present invention relates to user equipment, comprising: a transmission and reception unit configured to transmit and receive a radio channel to/from a base station via multiple cells configured for carrier aggregation; a simultaneous transmission availability determination unit configured to determine, in response to occurrence of an event where an uplink control channel is to be transmitted in the multiple cells simultaneously, whether the uplink control channel can be transmitted in the multiple cells simultaneously; and a transmission control unit configured to instruct the transmission and reception unit to transmit the uplink control channel in the multiple cells simultaneously if the uplink control channel can be transmitted in the multiple cells simultaneously and control transmission of the uplink control channel in accordance with transmission priorities corresponding to duplex modes if the uplink control channel cannot be transmitted in the multiple cells simultaneously.

Advantage of the Invention

According to the above aspects, it is possible to transmit an uplink control channel in multiple cells simultaneously in a radio communication system where transmission of the uplink control channel in a secondary cell is supported.

EMBODIMENTS OF THE INVENTION

Embodiments of the present invention are described below with reference to the drawings.

Summarizing embodiments as stated below, in a radio communication system using carrier aggregation, upon occurrence of an event to transmit an uplink control channel in multiple cells simultaneously, user equipment determines whether the to-be-transmitted uplink control channel can be transmitted in the multiple cells simultaneously. If the to-be-transmitted uplink control channel can be transmitted in the multiple cells simultaneously, the user equipment transmits the to-be-transmitted uplink control channel to a base station via the multiple cells. On the other hand, if the to-be-transmitted uplink control channel cannot be transmitted in the multiple cells, for example, the user equipment controls transmission of the uplink control channel in accordance with transmission priorities by assigning a relatively large amount of transmit power to the uplink control channel in a cell having a high transmission priority and a relatively small amount of transmit power to the uplink control channel in a cell having a low transmission priority or stopping the transmission.

The transmission priorities are based on cell types and/or duplex modes for the cells for simultaneous transmission of the uplink control channel. For example, as the cell types, a primary cell (PCell), a special secondary cell (Special SCell) and a secondary cell (Normal SCell) are used in carrier aggregation, and the transmission priorities of the respective cells are determined in the order of PCell>Special SCell>Normal SCell. Also, as the duplex modes, there are two modes, a frequency division duplex (FDD) mode and a time division duplex (TDD) mode, for example, and the transmission priorities of the respective cells are determined in such a manner that one of the two duplex modes is preferential.

In this manner, even if the to-be-transmitted uplink control channel cannot be transmitted in the multiple cells simultaneously, the uplink control channel can be transmitted simultaneously in accordance with the transmission priorities, and the uplink control channel having a high transmission priority can be received at the base stations more reliably than the uplink control channel having a low transmission priority.

Figure 1:
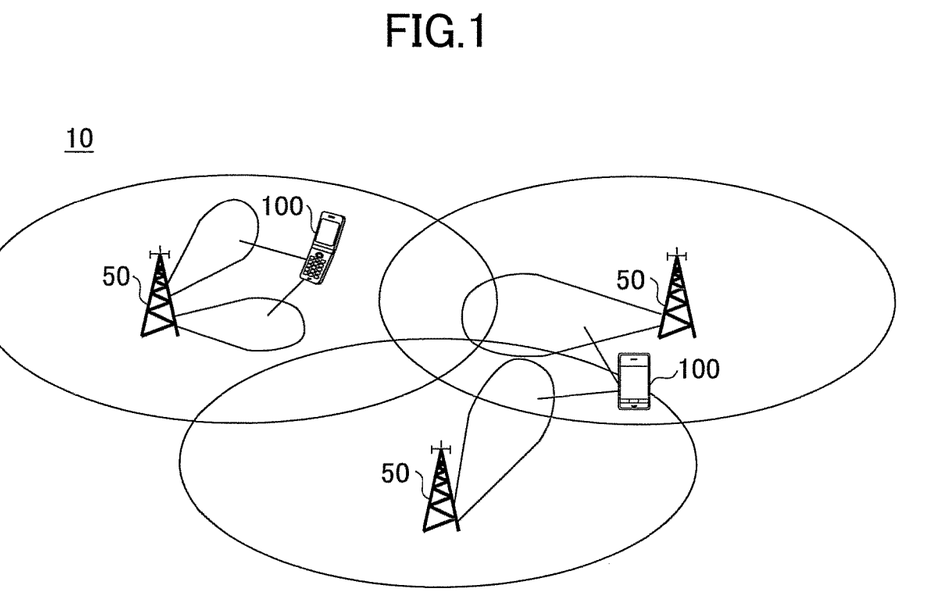
FIG. 1 is a schematic diagram for illustrating a radio communication system according to one embodiment of the present invention.

At the outset, a radio communication system according to one embodiment of the present invention is described with reference to FIG. 1. FIG. 1 is a schematic view for illustrating a radio communication system according to one embodiment of the present invention.

As illustrated in FIG. 1, a radio communication system 10 has one or more base stations (eNBs) 50 and one or more user equipments 100. In this embodiment, the radio communication system 10 is an LTE-Advanced system, but it is not limited to it and may be any appropriate radio communication system supporting carrier aggregation.

In the radio communication system 10 according to this embodiment, the single base station 50 provides multiple cells for communicating with the user equipment 100 and assigns a primary cell and a secondary cell from these cells to the user equipment 100 to communicate with the user equipment 100 via the cells (intra-eNB CA).

Also, the multiple base stations 50 provide multiple cells for communicating with the user equipment 100, and the primary cell and the secondary cell are assigned by different base stations 50 to the user equipment 100 to communicate with the user equipment 100 via the cells (inter-eNB CA).

Figure 2:
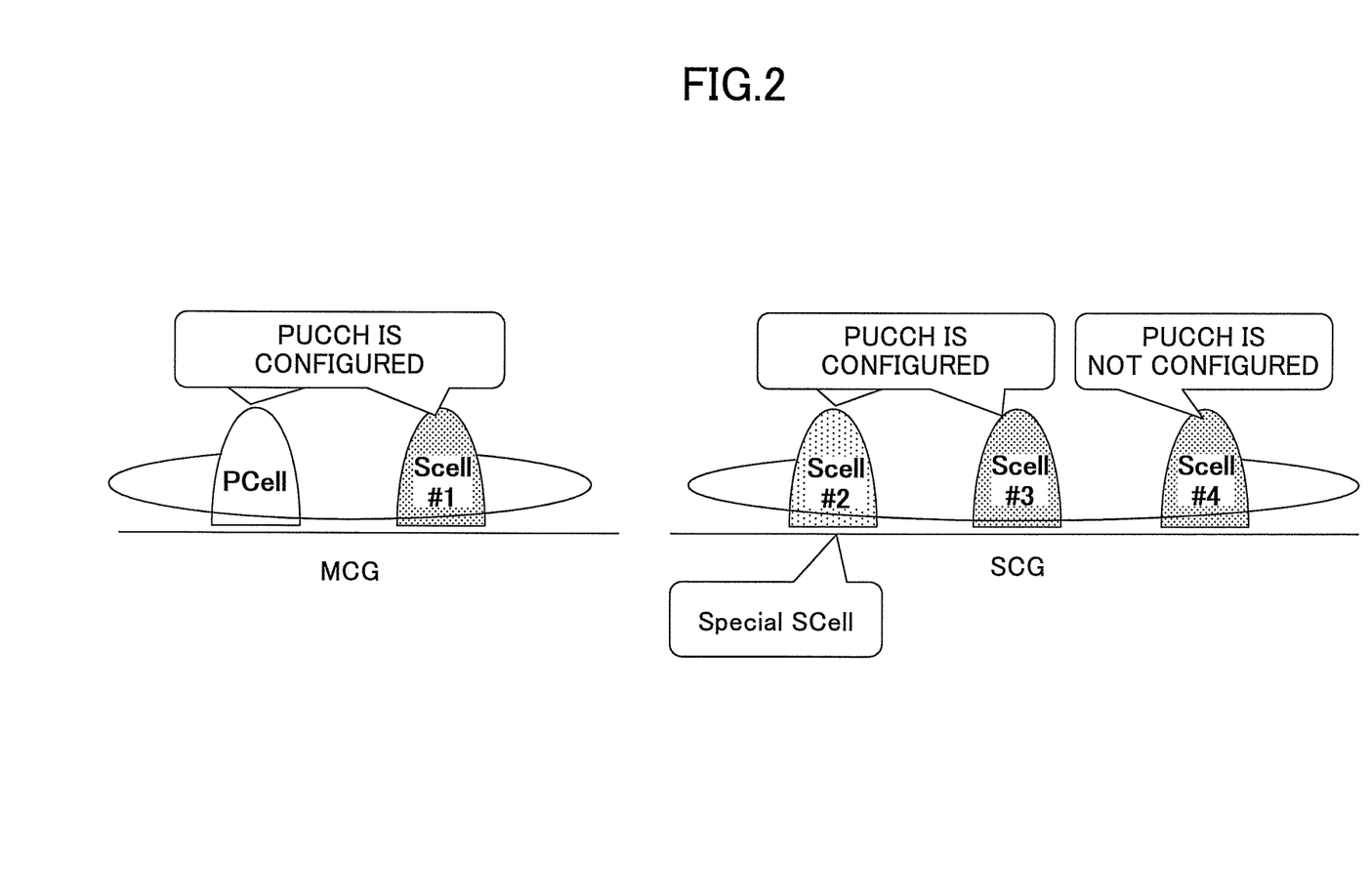
FIG. 2 is a schematic diagram for illustrating cell groups in inter-eNB CA according to one embodiment of the present invention.

In the inter-eNB CA, as illustrated in FIG. 2, control is performed in a per cell group (CG) basis where multiple CCs are grouped. The CG that includes the primary cell (PCell) is referred to as a master CG (master-CG: MCG), and the CG that does not include the PCell is referred to as a secondary CG (Secondary-CG: SCG). In the CGs, multiple CCs may support the PUCCH. As illustrated, a Special SCell may be set in the SCG. For example, the Special SCell is a predefined secondary cell supporting a CBRA (Contention based RACH), an Always Activated Secondary Cell and so on.

Also, in the radio communication system 10, the two duplex modes, a FDD mode and a TDD mode, are used together, and each cell provided by one or more base stations 50 communicates with the user equipment 100 by using one or both of the two duplex modes.

Through radio connections to the user equipment 100, the base station 50 transmits downlink data received from a communicatively connected upper station or server (not shown) to the user equipment 100 and transmits uplink data received from the user equipment 100 to the upper station (not shown). In this embodiment, the base station 50 is a LTE-Advanced compliant eNB, but it is not limited to it and may be any appropriate base station supporting the intra-eNB carrier aggregation and the inter-eNB carrier aggregation. Also, the base station 50 corresponds to one or both duplex modes of the FDD mode and the TDD mode and provides one or more cells in the supported duplex mode. In this embodiment, the base station 50 supports the intra-eNB carrier aggregation where the FDD mode and the TDD mode are used together (FDD+TDD Intra-eNB CA) and the inter-eNB carrier aggregation where the FDD mode and the TDD mode are used together (FDD+TDD Inter-eNB CA).

Typically, the user equipment 100 is a mobile phone, a smartphone, a tablet, a mobile router and so on, but it is not limited to it and may be any appropriate user equipment with a radio communication function. In a typical hardware arrangement, the user equipment 100 is arranged with a CPU (Central Processing Unit) such as a processor, a memory device such as a RAM (Random Access Memory), an auxiliary storage device such as a hard disk device, a communication device for communicating radio signals, an interface device for interfacing with a user, and so on. Functions of the user equipment 100 as stated below may be implemented by the CPU loading data and programs stored in the auxiliary storage device to the memory device via the communication device and/or the interface device and processing the data in accordance with the loaded programs.

Figure 3:
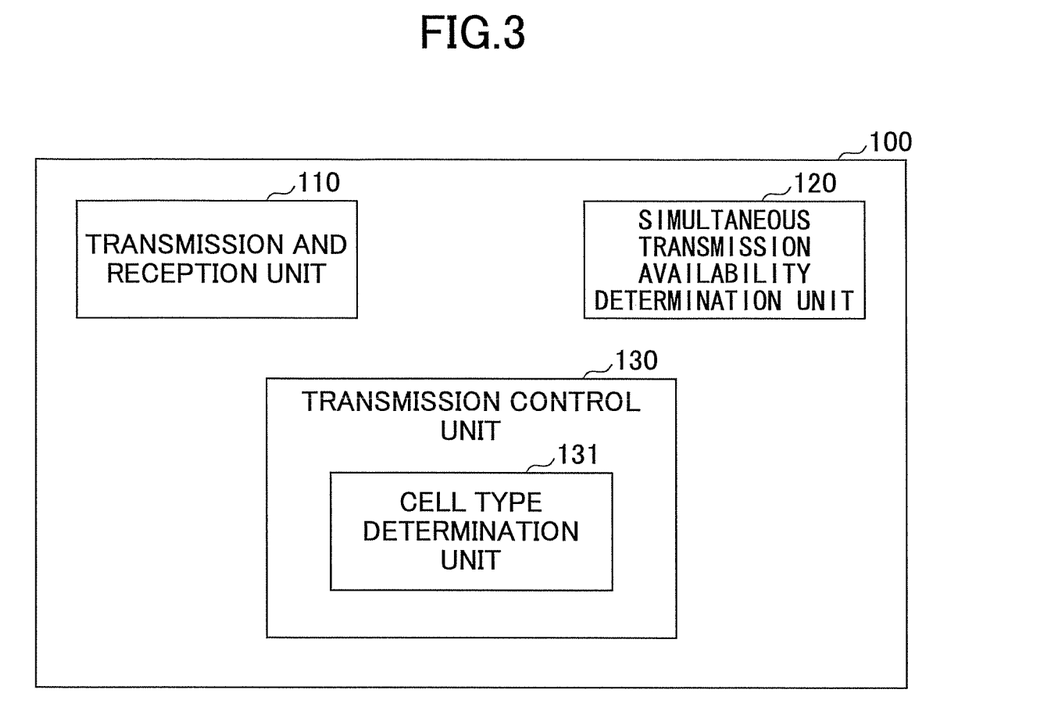
FIG. 3 is a diagram for illustrating an arrangement of user equipment according to one embodiment of the present invention.

Next, an arrangement of the user equipment according to one embodiment of the present invention is described with reference to FIG. 3. FIG. 3 is a diagram for illustrating an arrangement of the user equipment according to one embodiment of the present invention.

As illustrated in FIG. 3, the user equipment 100 has a transmission and reception unit 110, a simultaneous transmission availability determination unit 120 and a transmission control unit 130. In this embodiment, the transmission control unit 130 has a cell type determination unit 131.

The transmission and reception unit 110 transmits and receives various radio channels, such as uplink/downlink control channels and uplink/downlink data channels, to/from the base station 50. In the LTE-Advanced compliant radio communication system 10, the user equipment 100 receives a PDCCH (Physical Downlink Control Channel) and a PDSCH (Physical Downlink Shared Channel) from the base station 50 and transmits a PRACH (Physical Random Access Channel), a PUCCH (Physical Uplink Control Channel), a PUSCH (Physical Uplink Shared Channel) and a SRS (Sounding Reference Symbol) to the base station 50.

In this embodiment, the radio communication system 10 supports carrier aggregation, and the base station 50 can communicate with the user equipment 100 via a primary cell and a secondary cell. For example, in the intra-eNB carrier aggregation, the single base station 50 assigns the primary cell and the secondary cell from its served multiple cells to the user equipment 100 and communicates with the user equipment 100 via these cells. In this case, the transmission and reception unit 110 exchanges various radio channels with the base station 50 serving the cells. Also, in the inter-eNB carrier aggregation, the multiple base stations 50 assign the primary cell and the secondary cell from their served cells to the user equipment 100 and communicate with the user equipment 100 via the cells. In this case, the transmission and reception unit 110 exchanges various radio channels with the different base stations 50 serving the assigned cells. In general, in the inter-eNB CA, the different base stations 50 use respective schedulers to assign their served cells to the user equipment 100. To this end, it is assumed that the respective base stations 50 perform communication operations with the user equipment 100 in parallel such as scheduling, acknowledgement and radio quality measurement, and all combinations of uplink control information (UCI) such as a PUCCH-SR, a PUCCH-ACK/NACK and a PUCCH-CQI are transmitted simultaneously. Here, the PUCCH-SR is an uplink control channel for the user equipment 100 to transmit a scheduling request to the base station 50, the PUCCH-ACK/NACK is an uplink control channel for the user equipment 100 to report successful or unsuccessful reception of a data channel from the base station 50, and the PUCCH-CQI is an uplink control channel for the user equipment 100 to report measured radio quality such as a CQI (Channel Quality Indicator) to the base station 50.

The simultaneous transmission availability determination unit 120 determines, in response to occurrence of an event where an uplink control channel is transmitted in multiple cells simultaneously, whether the uplink control channel can be transmitted in the multiple cells simultaneously. This simultaneous transmission event may be that the user equipment 100 transmits a scheduling request to the base station 50, for example. Alternatively, the event may be that the user equipment 100 receives a data channel from the base station 50 and transmits acknowledgement indicating whether the data channel has been successfully received. Alternatively, the simultaneous transmission event may be that the user equipment 100 is requested by the base station 50 to measure radio quality such as a CQI and report the measured radio quality, or the simultaneous transmission event may be periodic transmission timings of the radio quality.

In one embodiment, the simultaneous transmission availability determination unit 120 may determine whether simultaneous transmission can be performed by determining whether the user equipment 100 has a function to transmit an uplink control channel via multiple cells simultaneously or whether the function is configured. In another embodiment, the simultaneous transmission availability determination unit 120 may determine whether the simultaneous transmission can be performed by determining whether the user equipment 100 reserves an amount of transmit power sufficient for the simultaneous transmission. The simultaneous transmission availability determination unit 120 indicates the determination result to the transmission control unit 130.

The transmission control unit 130 controls transmission of an uplink control channel by the transmission and reception unit 110 in accordance with the received result of the simultaneous transmission availability determination. In other words, if the uplink control channel can be transmitted in multiple cells simultaneously, the transmission control unit 130 instructs the transmission and reception unit 110 to transmit the uplink control channel in the multiple cells simultaneously. On the other hand, if the uplink control channel cannot be transmitted in the multiple cells simultaneously, the transmission control unit 130 controls transmission of the uplink control channel in accordance with configured transmission priorities.

In one embodiment, when the simultaneous transmission event of an uplink control channel in multiple cells occurs but the simultaneous transmission availability determination unit 120 determines that the simultaneous transmission cannot be performed, the transmission control unit 130 assigns a relatively large amount of transmit power to a cell having a higher priority and assigns a relatively small amount of transmit power to a cell having a lower priority or stops transmission of the uplink control channel in the cell having the lower priority in accordance with the configured transmission priorities.

In another embodiment, for the PUCCH transmitted in a cell having a low priority, the transmission control unit 130 may reduce the transmit power for an overlapping portion or drop the overlapping portion. In general, transmission timings of subframes from different cells are not completely identical, and these subframes are transmitted from the cells at slight time differences. Accordingly, for a portion where transmission periods do not overlap, the above-stated power control in the simultaneous transmission may not be performed, and the power reduction may be performed for only the overlapping portion, or the overlapping portion may not be transmitted.

Also, in LTE standard, it is defined that one subframe consists of two slots. Accordingly, if a symbol even partially overlaps for the PUCCH transmitted in a cell having a low priority, the transmission control unit 130 may reduce the transmit power in a per slot basis (instead of a per subframe basis. This is because many PUCCHs are spread in a slot in a closed manner, and if the transmit power is reduced for only the overlapping symbol, orthogonality cannot be retained. On the other hand, if the transmit power is reduced for the whole subframe, reception quality cannot be ensured. To this end, in order to achieve compatibility of both the retained orthogonality and the ensured reception quality, the transmission control unit 130 may reduce the transmit power for the slot including the overlapping symbol.

In the embodiment illustrated in FIG. 3, the transmission control unit 130 has a cell type determination unit 131 and controls transmission of an uplink control channel in accordance with transmission priorities corresponding to cell types based on the cell types determined by the cell type determination unit 131.

In one embodiment, for three cell types, a primary cell (PCell), a Special secondary cell (Special SCell) and a secondary cell (Normal SCell), the transmission control unit 130 transmits the uplink control channel in accordance with the transmission priorities of PCell>Special SCell>Normal SCell.

In the inter-eNB CA, communication is controlled in a unit of cell group (CG) where multiple CCs are grouped, and the multiple CCs support the PUCCH in each CG. As stated above with reference to FIG. 2, a master CG (MCG) is provided as a CG including the primary cell, and a secondary CG (SCG) is provided as a CG including no primary cell. Also, for the SCG, Special SCell is provided as a predefined secondary cell such as a secondary cell supporting CBRA (Contention based RACH) and an Always Activated Secondary Cell.

Figure 4:
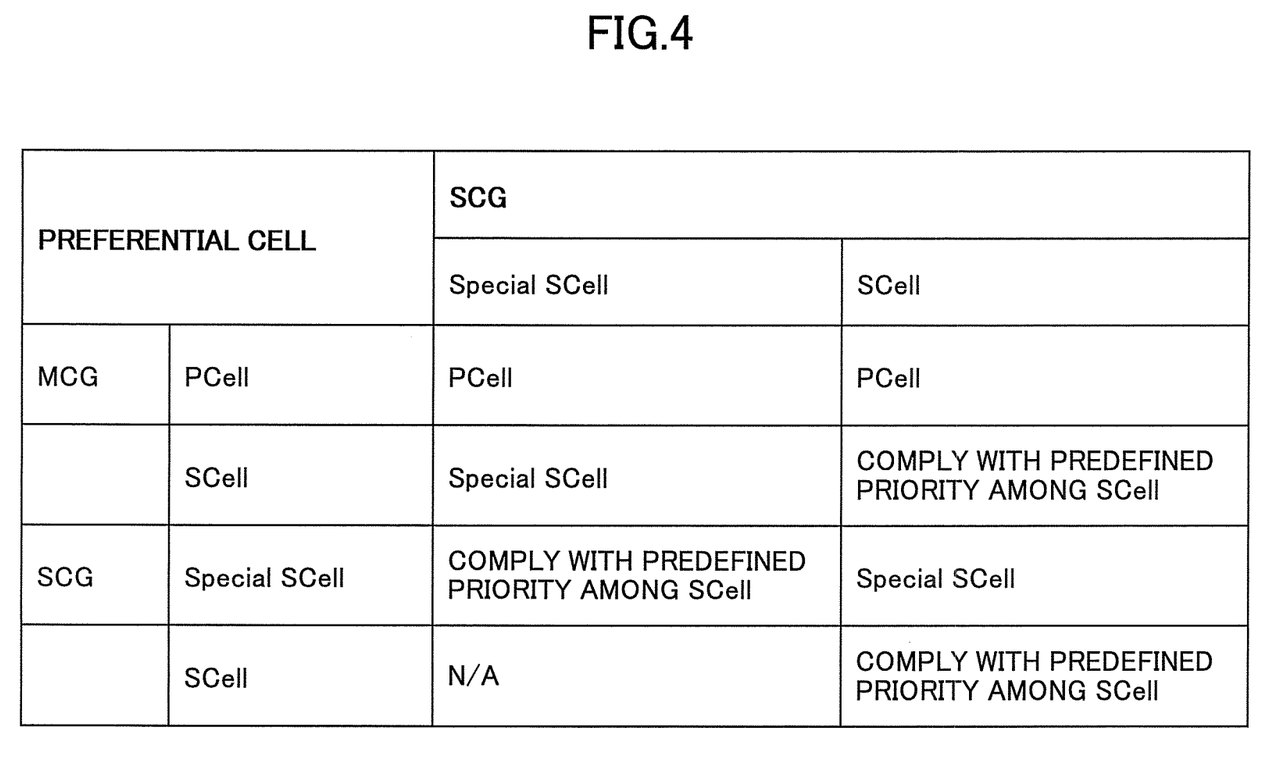
FIG. 4 is a diagram for illustrating priorities corresponding to cell types according to one embodiment of the present invention.

Among these cell groups and various cells, the PUCCH transmission priorities are defined. FIG. 4 is a diagram for illustrating priorities corresponding to cell types according to one embodiment of the present invention. In FIG. 4, the priority relationship corresponding to the cell types is exemplary illustrated between the PCell and SCell (Normal SCell) in the MCG and the Special SCell and SCell (Normal SCell) in the SCG and the Special SCell and Normal SCell in the SCG.

As illustrated in FIG. 4, among the PCell in the MCG and the Special SCell and SCell (Normal SCell) in the SCG, the PCell is prioritized over any of the Special SCell and Normal SCell in the SCG. In other words, when a PUCCH simultaneous transmission event arises in the PCell and the Special SCell or the Normal SCell but the simultaneous transmission availability determination unit 120 determines that the simultaneous transmission cannot be performed, the transmission control unit 130 prioritizes the PUCCH transmission in the PCell over the Special SCell and the Normal SCell by assigning a relatively large amount of transmit power to the PUCCH transmission in the PCell in the MCG and assigning a relatively small amount of transmit power to the PUCCH transmission in the Special SCell and the Normal SCell or stopping the transmission.

Next, between the Normal SCell in the MCG and the Special SCell in the SCG, the Special SCell in the SCG is prioritized over the Normal SCell in the MCG. In other words, when the PUCCH simultaneous transmission event arises in the Normal SCell in the MCG and the Special SCell in the SCG but the simultaneous transmission availability determination unit 120 determines that the simultaneous transmission cannot be performed, the transmission control unit 130 prioritizes the PUCCH transmission in the Special SCell in the SCG over the Normal SCell in the MCG by assigning a relatively large amount of transmit power to the PUCCH transmission in the Special SCell in the SCG and assigning a relatively small amount of transmit power to the PUCCH transmission in the Normal SCell in the MCG or stopping the transmission.

Next, between the Normal SCell in the MCG and the Normal SCell in the SCG, the transmission priorities between the Normal SCell in the MCG and the Normal SCell in the SCG are determined in accordance with predefined priorities between the SCells.

In one embodiment, the transmission priorities between the Normal SCell in the MCG and the Normal SCell in the SCG may be predefined in accordance with types of uplink control channels. In the LTE-Advanced compliant radio communication system 10, for example, three types of PUCCHs, a PUCCH-SR, a PUCCH-ACK/NACK and a PUCCH-CQI, are transmitted from the user equipment 100 to the base station 50. The transmission priorities between the Normal SCell in the MCG and the Normal SCell in the SCG may be set such that the PUCCH-SR, the PUCCH-ACK/NACK and the PUCCH-CQI transmitted from the Normal SCell in the MCG and the Normal SCell in the SCG can be transmitted in accordance with the transmission priorities of PUCCH-SR>PUCCH-ACK/NACK>PUCCH-CQI. For example, if the user equipment 100 transmits the PUCCH-ACK in the Normal SCell in the MCG and the PUCCH-CQI in the Normal SCell in the SCG, the transmission control unit 130 prioritizes the PUCCH-ACK transmission in the Normal SCell in the MCG over the PUCCH-CQI transmission in the Normal SCell in the SCG. Note that the uplink control channels of the present invention are not limited to the above-stated PUCCH-SR, PUCCH-ACK/NACK and PUCCH-CQI and any other types of uplink control channels may be used. It is preferable that the transmission priorities corresponding to the channel types as stated above be basically defined such that more important uplink control channels can be preferentially transmitted in implementation of radio communication between the base station 50 and the user equipment 100.

Note that the above-stated transmission priorities between the secondary cells based on the channel types may be dynamically changed depending on communication states between the base station 50 and the user equipment 100, for example. In typical radio communication between the base station 50 and the user equipment 100, upon occurrence of some communication demands at the user equipment 100, the user equipment 100 transmits a scheduling request to the base station 50. After the scheduling is performed, communication between the user equipment 100 and the base station 50 is initiated. To this end, the transmission priority of the PUCCH-SR may be set to be higher at timings before initiation of the communication. On the other hand, the user equipment 100 typically receives a data channel from the base station 50 and transmits the data channel to the base station 50 after initiation of the communication. To this end, the transmission priority of the PUCCH-ACK/NACK may be set to be higher after initiation of the communication. Also, if the CQI reported from the user equipment 100 is lower than or equal to a predefined threshold, the transmission priority of the PUCCH-ACK/NACK may be set to be higher due to increasing likelihood of retransmission. Also, if a variation size of the measured CQI is greater than or equal to a predefined threshold, the transmission priority of the PUCCH-CQI may be set to be higher so as to follow variations of radio quality rapidly.

Also, the above-stated transmission priorities between secondary cells based on channel types may be indicated from the base station 50. In the LTE-Advanced compliant radio communication system 10, for example, the base station 50 may set the transmission priorities among the to-be-transmitted PUCCH-SR, PUCCH-ACK/NACK and PUCCH-CQI and indicates it to the user equipment 100. Also, the base station 50 may dynamically set the priority depending on communication states with the user equipment 100 and indicate it to the user equipment 100. For example, if a large number of user equipments 100 are in connection to the base station 50, it may not be preferable that the base station 50 receives one certain type of PUCCH (such as a PUCCH-SR) intensively. In fact, if the PUCCH-SR is received from a large number of user equipments 100 simultaneously, the base station 50 would temporarily bear a large processing workload associated with scheduling. In order to avoid such a situation, for example, the base station 50 may divide the connecting user equipments 100 into multiple groups and configure different transmission priorities for each of the groups dynamically.

In another embodiment, the transmission priorities between the Normal SCell in the MCG and the Normal SCell in the SCG may be set in accordance with the order of communication quality for the secondary cells, the order of indices (SCellIndex) for the secondary cells and so on. Here, the SCellIndex is assigned at timings when each secondary cell is assigned to the user equipment 100. For example, SCellIndex=1 is assigned for the first assigned secondary cell, SCellIndex=2 is assigned for the second assigned secondary cell, and the SCellIndex is similarly assigned for subsequent secondary cells. Note that various configurations of the transmission priorities between the Normal SCell in the MCG and the Normal SCell in the SCG may be used singularly or in combination.

Next, similar to the above-stated transmission priorities between secondary cells, the transmission priorities between the Special SCells in the SCG are determined. In other words, the transmission priorities between the Special SCells may be predefined in accordance with types of uplink control channels and may be defined in accordance with the order of communication quality of the secondary cells, indices (SCellIndex) of the secondary cells and so on. For example, if the user equipment 100 transmits a PUCCH-ACK in one Special SCell and a PUCCH-CQI in the other Special SCell, the transmission control unit 130 may determine the transmission priorities between the Special SCells to prioritize the PUCCH-ACK transmission over the PUCCH-CQI transmission.

Next, between the Special SCell in the SCG and the Normal SCell in the SCG, the Special SCell is prioritized over the Normal SCell. In other words, when the PUCCH simultaneous transmission event arises in the Special SCell and the Normal SCell but the simultaneous transmission availability determination unit 120 determines that the simultaneous transmission cannot be performed, the transmission control unit 130 prioritizes the PUCCH transmission in the Special SCell over the Normal SCell by assigning a relatively large amount of transmit power to the PUCCH transmission in the Special SCell and assigning a relatively small amount of transmit power to the PUCCH transmission in the Normal SCell or stopping the transmission.

Note that for the transmission priorities between the Normal SCells in the SCG, the above-stated transmission priorities between secondary cells are used.

Figure 5:
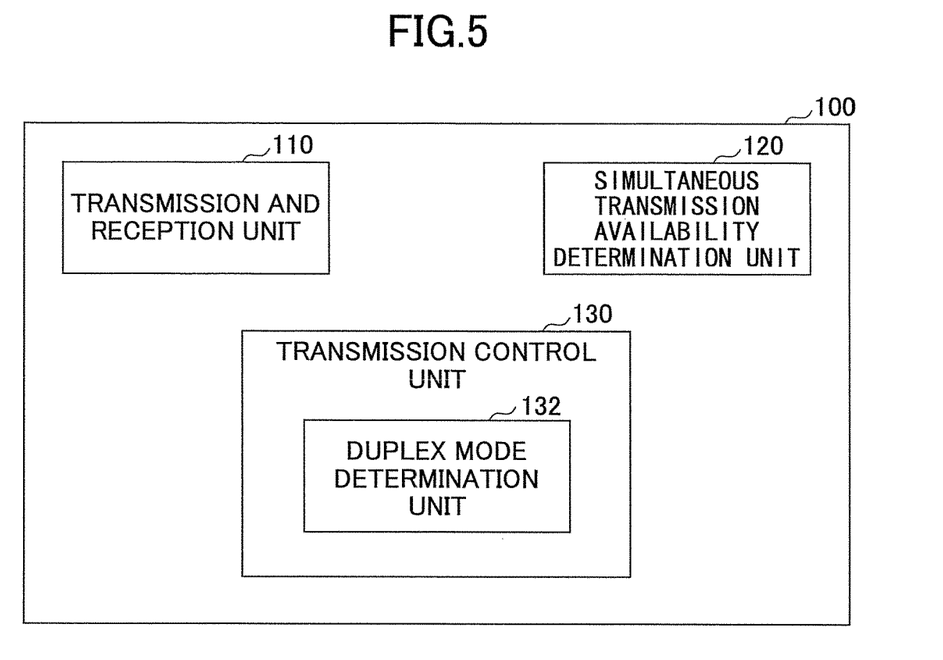
FIG. 5 is a diagram for illustrating an arrangement of user equipment according to another embodiment of the present invention.

Next, an arrangement of user equipment according to another embodiment of the present invention is described with reference to FIG. 5. FIG. 5 is a diagram for illustrating an arrangement of the user equipment according to another embodiment of the present invention.

As illustrated in FIG. 5, the user equipment 100 has a transmission and reception unit 110, a simultaneous transmission availability determination unit 120 and a transmission control unit 130. In this embodiment, the transmission control unit 130 has a duplex mode determination unit 132.

The transmission and reception unit 110 and the simultaneous transmission availability determination unit 120 are similar to those illustrated in FIG. 3, but the transmission and reception unit 110 according to this embodiment transmits and receives a radio channel to/from the base station 50 via multiple cells configured for carrier aggregation in accordance with a FDD mode and a TDD mode. In LTE, two duplex modes, the frequency division duplex (FDD) mode and the time division duplex mode (TDD) mode, are defined. In the FDD mode, uplink communication and downlink communication are performed in mutually different frequency bands, and in the TDD mode, uplink communication and downlink communication use the same frequency band where the uplink communication and the downlink communication are divided in time. In the TDD mode, a time ratio assigned to uplink/downlink is not limited to 1:1, and different ratios may be used. Switching between the duplex modes can be performed in inter-frequency handover.

In the embodiment as illustrated in FIG. 5, the transmission control unit 130 has the duplex mode determination unit 132 and controls transmission of an uplink control channel in accordance with transmission priorities corresponding to the duplex modes based on the duplex modes determined by the duplex mode determination unit 132. In other words, the duplex mode determination unit 132 determines whether the communication mode applied to each cell for simultaneous transmission of the uplink control channel is the FDD mode or the TDD mode. The transmission control unit 130 determines the transmission priorities between cells based on the determination and controls transmission of the uplink control channel in accordance with the determined transmission priorities between cells.

In one embodiment, the transmission control unit 130 prioritizes transmission of the uplink control channel in a FDD applied cell (FDD cell) over a TDD applied cell (TDD cell). The FDD cell is a cell of the duplex mode already used in the LTE widely and is assumed to be used as a core band, and there is a high likelihood that the FDD cell may be used as the PCell to ensure connectivity between the user equipment 100 and the base station 50. This is because if an uplink control channel transmitted from the user equipment 100 in the PCell cannot be received, there is a possibility that the connectivity between the user equipment 100 and the base station 50 may be affected.

In another embodiment, the transmission control unit 130 prioritizes transmission of an uplink control channel in a TDD cell over a FDD cell. In the TDD where a communication path is segmented in a time axis and transmission and reception are implemented by switching between the transmission and the reception, the communication path is assigned for downlink communication and uplink communication at a different ratio (DL/UL ratio), and a relatively short amount of time is typically assigned to the uplink communication. In the TDD cell, uplink transmission timings are scarce, and the transmission control unit 130 may prioritize transmission of an uplink control channel in the TDD cell. Note that the DL/UL ratio is determined by a TDD configuration indicated from the network side. Accordingly, the transmission control unit 130 may further adjust the transmission priorities in the TDD cell corresponding to a relative occasion number of uplink transmission timings. For example, the transmission control unit 130 may transmit an uplink control channel in the TDD cell in accordance with a higher transmission priority, for example, assign a larger amount of transmit power to a TDD configuration having a relatively small amount of uplink transmission timings.

Figure 6:
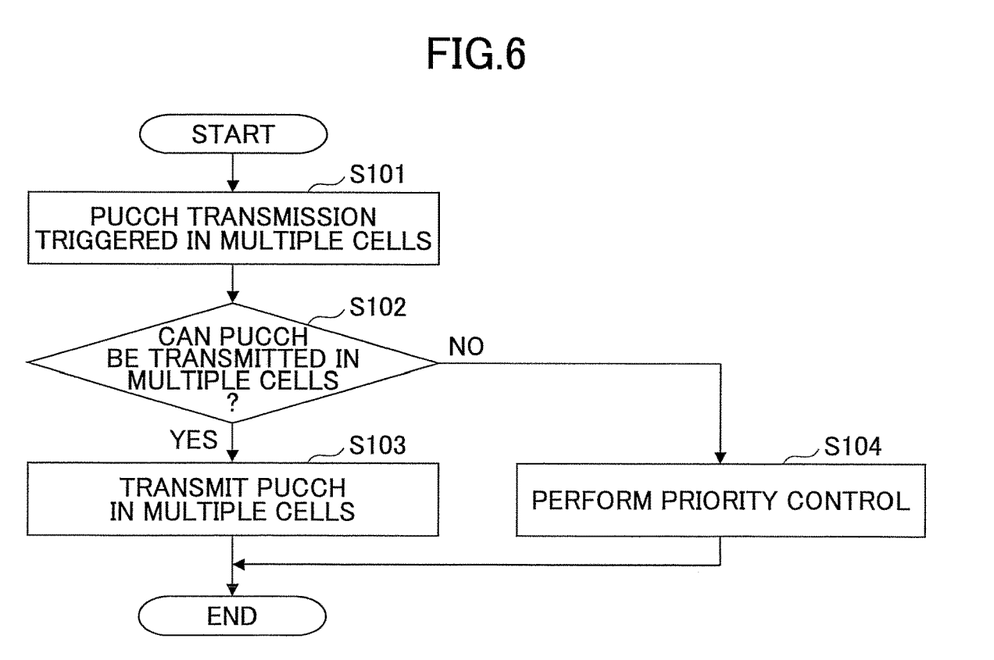
FIG. 6 is a flowchart illustrating a PUCCH transmission operation according to another embodiment of the present invention.

Next, simultaneous transmission operations for an uplink control channel at the user equipment according to one embodiment of the present invention are described with reference to FIG. 6. FIG. 6 is a flowchart for illustrating a PUCCH transmission operation according to one embodiment of the present invention.

As illustrated in FIG. 6, at step S101, the user equipment 100 detects an event to transmit a PUCCH in multiple cells simultaneously. For example, this event may be that the user equipment 10 transmits a scheduling request to the base station 50, that the user equipment 100 receives a data channel from the base station 50 and transmits acknowledgement indicating whether the data channel has been successfully received, or that the user equipment 100 is requested by the base station 50 to measure radio quality such as a CQI and report the measured radio quality.

At step S102, in response to the event, the simultaneous transmission availability determination unit 120 determines whether a PUCCH can be transmitted in multiple cells simultaneously. In one embodiment, the simultaneous transmission availability determination unit 120 may determine whether the simultaneous transmission can be performed by determining whether a function to transmit the PUCCH via the multiple cells simultaneously is configured for the user equipment 100. In another embodiment, the simultaneous transmission availability determination unit 120 may determine whether the simultaneous transmission can be performed by determining whether the user equipment 100 can reserve an amount of transmit power sufficient for simultaneous transmission.

If it is determined that the PUCCH can be transmitted in the multiple cells simultaneously (S102: Y), the flow proceeds to step S103, and the transmission control unit 130 instructs the transmission and reception unit 110 to transmit the PUCCH in the multiple cells simultaneously.

On the other hand, if it is determined that the PUCCH cannot be transmitted in the multiple cells simultaneously (S102: N), the flow proceeds to step S104, and the transmission control unit 130 prioritizes the to-be-transmitted PUCCH in accordance with the transmission priorities and instructs the transmission and reception unit 110 to transmit the PUCCH to the base station 50 in accordance with the priorities.

In one embodiment, the transmission control unit 130 determines a cell type of each cell and controls the PUCCH transmission in the cell in accordance with the transmission priorities corresponding to the cell type. For example, the transmission control unit 130 may prioritize the PUCCH transmission in cells in accordance with the transmission priorities of the order of the PCell, the Special SCell and the Normal SCell.

Also, in another embodiment, the transmission control unit 130 determines a duplex mode applied to each cell and controls the PUCCH transmission in the cell in accordance with the transmission priorities corresponding to the determined duplex mode. For example, the transmission control unit 130 may prioritize a FDD cell or a TDD cell in accordance with predefined transmission priorities corresponding to duplex modes. Also, in the TDD, different uplink transmission timings are used depending on a TDD configuration indicated by the network side. Accordingly, if the TDD configuration having a relatively small occasion amount of uplink transmission timings is configured for the TDD cell, the PUCCH transmission priority in the TDD cell may be adjusted depending on the number of uplink transmission timings.

Upon determining the transmission priorities for cells for transmitting the PUCCH simultaneously in accordance with any of the above-stated embodiments, the transmission control unit 130 assigns a larger amount of transmit power for a cell having a higher priority and a smaller amount of transmit power for a cell having a lower priority or stops transmission in the cell. Alternatively, if there is an overlapping portion for the PUCCH transmitted in a cell having a lower priority, the transmission control unit 130 may reduce the transmit power for only the overlapping portion or drop the overlapping portion. Also, if there is an overlapping symbol for the PUCCH transmitted in a cell having a lower priority, the transmission control unit 130 may reduce the transmit power for a slot including the overlapping symbol.

When the transmit power is assigned in this manner, the transmission control unit 130 controls the transmission and reception unit 110 to transmit the PUCCH at the transmit power assigned for cells for simultaneous transmission.

Also, when the user equipment 100 communicates with multiple eNBs in inter-eNB CA, the transmission priorities may differ depending on combinations of eNBs.

In the above-stated embodiments, the two transmission priorities, the transmission priorities corresponding to cell types and the transmission priorities corresponding to duplex modes, are separately applied. However, the present invention is not limited to it, and the transmission priorities in cells may be determined in combinations of the transmission priorities corresponding to cell types and the transmission priorities corresponding to duplex modes. For example, if multiple Special SCells or multiple SCells are for simultaneous transmission of an uplink control channel, the priorities between the Special SCells or between the SCells may be determined corresponding to the prioritized duplex mode.

Although the embodiments of the present invention have been described in detail, the present invention is not limited to the above-stated specific embodiments, and various modifications and variations can be made within the spirit of the present invention as recited in claims.

This international patent application claims priority based on Japanese Priority Application No. 2014-016004 filed on Jan. 30, 2014, the entire contents of which are hereby incorporated by reference.

LIST OF REFERENCE SYMBOLS

10: radio communication system

50: base station

100: user equipment

110: transmission and reception unit

120: simultaneous transmission availability determination unit
130: transmission control unit
131: cell type determination unit
132: duplex mode determination unit

The invention claimed is:

1. A user equipment comprising:
a transceiver that transmits and receives a radio channel to and from a plurality of base stations via multiple cells configured for carrier aggregation;
a processor configured to:
in response to occurrence of an event where an uplink control channel is to be simultaneously transmitted in the multiple cells, determine whether the uplink control channel can be simultaneously transmitted in the multiple cells,
instruct the transceiver to simultaneously transmit the uplink control channel in the multiple cells if the uplink control channel can be simultaneously transmitted in the multiple cells, and
control transmission of the uplink control channel in accordance with transmission priorities corresponding to a respective cell type of each of the multiple cells if the uplink control channel cannot be simultaneously transmitted in the multiple cells,
wherein the processor is further configured to:
determine which of a primary cell or a secondary cell the cell type of each cell is; and
control transmission of the uplink control channel in the determined cell corresponding to the determination in accordance with a transmission priority order of the primary cell and the secondary cell, and
wherein the plurality of base stations each independently perform measurements with the user equipment.

2. The user equipment as claimed in claim 1, wherein the processor further:
assigns a larger amount of transmit power to a cell having a higher transmission priority and assigns a smaller amount of transmit power to a cell having a lower transmission priority, or
stops transmission of the uplink control channel in the cell having the lower transmission priority according to the transmission priority of the cell having the lower transmission priority.

3. The user equipment as claimed in claim 2, wherein if the uplink control channel transmitted in the cell having the lower transmission priority includes an overlapping symbol, the processor reduces the transmit power for a slot including the overlapping symbol.

4. A transmission control method for use in user equipment transmitting and receiving a radio channel to and from a plurality of base stations via multiple cells configured for carrier aggregation, comprising:
detecting occurrence of an event where an uplink control channel is to be simultaneously transmitted in the multiple cells;
determining whether the uplink control channel can be simultaneously transmitted in the multiple cells;
simultaneously transmitting the uplink control channel in the multiple cells if the uplink control channel can be simultaneously transmitted in the multiple cells; and
controlling transmission of the uplink control channel in accordance with transmission priorities corresponding to a respective cell type of each of the multiple cells if the uplink control channel cannot be simultaneously transmitted in the multiple cells,
wherein the method further comprises:
determining which of a primary cell or a secondary cell the cell type of each cell is; and
controlling transmission of the uplink control channel in the determined cell corresponding to the determination in accordance with a transmission priority order of the primary cell and the secondary cell, and
wherein the plurality of base stations each independently perform measurements with the user equipment.

* * * * *